United States Patent
Lee et al.

(10) Patent No.: US 11,732,111 B2
(45) Date of Patent: Aug. 22, 2023

(54) NATURAL RUBBER COMPOSITION AND MOLDED ARTICLE MANUFACTURED USING THE SAME

(71) Applicants: Hyundai Motor Company, Seoul (KR); Kia Corporation, Seoul (KR)

(72) Inventors: Sung Hyun Lee, Seongnam-si (KR); Hyun Ho Park, Suwon-si (KR); Jae Seok Lee, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 60 days.

(21) Appl. No.: 17/375,736

(22) Filed: Jul. 14, 2021

(65) Prior Publication Data

US 2022/0162425 A1 May 26, 2022

(30) Foreign Application Priority Data

Nov. 23, 2020 (KR) .......................... 10-2020-0157335

(51) Int. Cl.
| | |
|---|---|
| *C08L 7/00* | (2006.01) |
| *C08K 3/04* | (2006.01) |
| *C08K 3/36* | (2006.01) |
| *C08K 3/06* | (2006.01) |
| *C08K 3/22* | (2006.01) |
| *C08K 5/548* | (2006.01) |
| *C08K 5/40* | (2006.01) |
| *C08K 5/18* | (2006.01) |
| *C08K 5/09* | (2006.01) |

(52) U.S. Cl.
CPC .................. *C08L 7/00* (2013.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/40* (2013.01); *C08K 5/548* (2013.01); *C08K 2003/2296* (2013.01); *C08K 2201/003* (2013.01); *C08K 2201/006* (2013.01); *C08K 2201/011* (2013.01); *C08L 2201/08* (2013.01)

(58) Field of Classification Search
CPC ................ C08L 7/00; C08K 3/04; C08K 3/36
See application file for complete search history.

(56) References Cited

U.S. PATENT DOCUMENTS

| | | | | |
|---|---|---|---|---|
| 2006/0276583 | A1* | 12/2006 | Miyazaki ................ | C08K 3/36 524/575.5 |
| 2019/0144639 | A1* | 5/2019 | Balnis ..................... | C08K 3/06 524/575.5 |

FOREIGN PATENT DOCUMENTS

| | | | |
|---|---|---|---|
| JP | 2013221052 A | * | 10/2013 |
| KR | 101847372 B1 | | 4/2018 |
| KR | 20200055173 A | | 5/2020 |

OTHER PUBLICATIONS

Machine translation of JP-2013221052-A (Year: 2013).*

* cited by examiner

*Primary Examiner* — Wenwen Cai
(74) *Attorney, Agent, or Firm* — Slater Matsil, LLP

(57) ABSTRACT

A natural rubber composition includes a base resin including natural rubber, a filler including carbon black and silica, and an additive. The carbon black has a diameter of 20 nm to 50 nm, and the silica has a surface area of 100 to 150 m²/g. The additive includes at least one of a coupling agent, an activator, a crosslinking agent, an accelerator, or an anti-aging agent.

19 Claims, No Drawings

NATURAL RUBBER COMPOSITION AND MOLDED ARTICLE MANUFACTURED USING THE SAME

CROSS-REFERENCE TO RELATED APPLICATIONS

This application claims the benefit of Korean Patent Application No. 10-2020-0157335, filed on Nov. 23, 2020, which application is hereby incorporated herein by reference.

TECHNICAL FIELD

The present disclosure relates to a natural rubber composition and a molded article manufactured using the same.

BACKGROUND

A downsized high-efficiency engine has been developed for environmental reasons, such as depletion of limited resources and discharge of greenhouse gas, which inevitably causes an increase in atmospheric temperature of an engine compartment and chassis parts. Particularly, in hot regions, such as the Middle East, there is an increasing need to develop a material capable of improving heat resistance of chassis parts, such as a suspension.

A suspension bush, which inhibits vibration and noise generated at the time of driving a vehicle and improves comfortable driving of the vehicle, is mainly made of rubber, and thus has lower resistance to heat than other metal parts.

The above information disclosed in this Background section is provided only for enhancement of understanding of the background of the invention and therefore it may contain information that does not form the prior art that is already known to a person of ordinary skill in the art.

SUMMARY

Embodiments of the present invention can solve problems associated with the prior art.

The present disclosure relates to a natural rubber composition and a molded article manufactured using the same. Particular embodiments relate to a molded article manufactured using pure natural rubber alone without addition of synthetic rubber, whereby change in physical properties of the molded article is small even in a severe environment, such as a high-temperature environment.

An embodiment of the present invention provides a molded article having excellent long-term heat resistance at high temperature using natural rubber alone.

Another embodiment of the present invention provides a rubber molded article having high fatigue durability.

A further embodiment of the present invention provides a rubber molded article having a low material dynamic ratio value.

The embodiments of the present invention are not limited to those described above. The embodiments of the present invention will be clearly understood from the following description and could be implemented by means defined in the claims and a combination thereof.

One embodiment of the present invention provides a natural rubber composition including a base resin including natural rubber, a filler, and an additive, wherein the filler includes carbon black and silica.

The carbon black may have a diameter of 20 nm to 50 nm, and the silica may have a surface area of 100 to 150 m$^2$/g.

The filler may be included so as to account for 35 to 70 parts by weight based on 100 parts by weight of the base resin.

The carbon black may be included so as to account for 20 to 50 parts by weight based on 100 parts by weight of the base resin.

The silica may be included so as to account for 5 to 20 parts by weight based on 100 parts by weight of the base resin.

The additive may include at least one of a coupling agent, an activator, a crosslinking agent, an accelerator, and an anti-aging agent.

The additive may be included so as to account for 0.1 to 15 parts by weight based on 100 parts by weight of the base resin.

The coupling agent may include silane, and the coupling agent may be included so as to account for 1 to 4 parts by weight based on 100 parts by weight of the base resin.

The activator may include zinc oxide and stearic acid, and the activator may be included so as to account for 10 to 20 parts by weight based on 100 parts by weight of the base resin.

The zinc oxide may be included so as to account for 10 to 14 parts by weight based on 100 parts by weight of the base resin, and the stearic acid may be included so as to account for 1.5 to 3 parts by weight based on 100 parts by weight of the base resin.

The crosslinking agent may be included so as to account for 0.3 to 0.7 parts by weight based on 100 parts by weight of the base resin.

The accelerator may include a thiuram-based accelerator, and the accelerator may be included so as to account for 0.3 to 0.7 parts by weight based on 100 parts by weight of the base resin.

The anti-aging agent may include a heat anti-aging agent and an ozone anti-aging agent, and the anti-aging agent may be included so as to account for 0.6 to 1.4 parts by weight based on 100 parts by weight of the base resin.

Another embodiment of the present invention provides a molded article manufactured using the natural rubber composition.

Other aspects and preferred embodiments of the invention are discussed infra.

DETAILED DESCRIPTION OF ILLUSTRATIVE EMBODIMENTS

The objects described above, and other objects, features and advantages will be clearly understood from the following preferred embodiments. However, the present invention is not limited to the embodiments and will be embodied in different forms. The embodiments are suggested only to offer thorough and complete understanding of the disclosed contents and sufficiently inform those skilled in the art of the technical concept of the present invention.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

It should be understood that, in the specification, when the range refers to a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

The present invention relates to a natural rubber composition and a molded article manufactured using the same. In particular, embodiments of the present invention include a molded article having excellent heat resistance formed using natural rubber alone as a base resin.

A natural rubber composition according to embodiments of the present invention includes a base resin including natural rubber, a filler, and an additive.

Here, the respective ingredients included in the natural rubber composition according to embodiments of the present invention will be described.

Base Resin

A base resin according to embodiments of the present invention includes natural rubber alone.

The natural rubber exhibits excellent mixing dispersibility, strength, and fatigue durability. In the case in which butadiene rubber is added to the base resin, heat resistance may be improved; however, it is difficult to apply the base resin to a main part that requires both heat resistance and durability due to a decrease in mechanical strength and fatigue durability.

Filler

A filler according to embodiments of the present invention includes carbon black and silica. In particular, the silica is used to increase rigidity of a rubber material. In embodiments of the present invention, preferably, the silica has a surface area of 100 $m^2/g$ to 150 $m^2/g$, and the carbon black has a diameter of 20 nm to 50 nm.

The filler may be included so as to account for 35 to 70 parts by weight based on 100 parts by weight of the base resin.

Specifically, the carbon black is preferably included so as to account for 20 to 50 parts by weight based on 100 parts by weight of the base resin. If the content of the carbon black is less than 20 parts by weight, the hardness of a molded article becomes 50 Hs or less, whereby the strength of the molded article may be reduced. If the content of the carbon black is greater than 50 parts by weight, the hardness of the molded article becomes 70 Hs or more, whereby fatigue durability of the molded article may be insufficient.

The silica is preferably included so as to account for 5 to 20 parts by weight based on 100 parts by weight of the base resin. If the content of the silica is less than 5 parts by weight, the hardness of the molded article becomes 50 Hs or less, whereby the strength of the molded article may be reduced. If the content of the silica is greater than 20 parts by weight, a mixing quality problem, e.g. dispersion, may occur, and the hardness of the molded article becomes 70 Hs or more, whereby the molded article may be damaged due to insufficient fatigue durability.

Additive

An additive according to embodiments of the present invention may include at least one of a coupling agent, an activator, a crosslinking agent, an accelerator, and an anti-aging agent.

The additive preferably includes a coupling agent, an activator, a crosslinking agent, an accelerator, and an anti-aging agent.

The additive may be included so as to account for 0.1 to 15 parts by weight based on 100 parts by weight of the base resin.

The coupling agent preferably includes silane. Specifically, the interface of silica exhibiting polarity may be reformed, whereby excellent dispersion may be achieved and workability may be further improved. When a bifunctional silane coupling agent is used, force of coupling between silica and rubber is maximized, whereby the physical properties and dynamic performance of a material are improved.

The coupling agent is preferably included so as to account for 1 to 4 parts by weight based on 100 parts by weight of the base resin. If the content of the coupling agent is less than 1 parts by weight, silica dispersion and coupling between silica and rubber may be insufficient, whereby the basic physical properties and dynamic performance of the molded article may be reduced. If the content of the coupling agent is greater than 4 parts by weight, coupling between silica and rubber may be rather disturbed, whereby the basic physical properties and fatigue durability of the molded article may be reduced.

Both zinc oxide and stearic acid are preferably used as the activator for crosslinking acceleration.

In embodiments of the present invention, multi-sulfur crosslinking bonds, which may reduce heat resistance, are divided into single-sulfur crosslinking bonds using the zinc oxide and the stearic acid.

The activator may be included so as to account for 10 to 20 parts by weight based on 100 parts by weight of the base resin.

Specifically, the zinc oxide is preferably included so as to account for 10 to 14 parts by weight based on 100 parts by weight of the base resin. If the content of the zinc oxide is less than 10 parts by weight, the effect of dividing the multi-sulfur crosslinking bonds into the single-sulfur crosslinking bonds may be reduced. If the content of the zinc oxide is greater than 14 parts by weight, the physical properties of the molded article may be deteriorated due to generation of a non-reactant.

The stearic acid is preferably included so as to account for 1.5 to 3 parts by weight based on 100 parts by weight of the base resin. If the content of the stearic acid is less than 1.5 parts by weight, the effect of the activator may be reduced or improvement in heat resistance may be insignificant. If the content of the stearic acid is greater than 3 parts by weight, the physical properties of the molded article may be deteriorated due to generation of a non-reactant.

The crosslinking agent preferably includes sulfur.

It is important to mix an appropriate amount of sulfur in order to induce efficient vulcanization producing mainly single-sulfur crosslinking bonds, which are advantageous in heat resistance.

The crosslinking agent is preferably included so as to account for 0.3 to 0.7 parts by weight based on 100 parts by weight of the base resin. If the content of the crosslinking agent is less than 0.3 parts by weight, the mechanical strength and fatigue durability of the molded article may be insufficient due to absolute deficiency of crosslinking density. If the content of the crosslinking agent is greater than 0.7 parts by weight, the ratio of a disulfide bond and a multi-sulfur crosslinking bond may be increased, whereby conventional vulcanization may be induced, and the number of S—S bonds having insufficient thermal stability in a crosslinked chain structure is increased due to an increase in crosslinking length, whereby heat resistance of the molded article may be reduced.

The accelerator includes a thiuram-based accelerator, and preferably includes tetramethylthiuram disulfide.

The accelerator is preferably included so as to account for 0.3 to 0.7 parts by weight based on 100 parts by weight of the base resin. If the content of the accelerator is less than 0.3 parts by weight, the effect of the accelerator is low, whereby crosslinkability may be insufficient and the mechanical strength of the molded article may be reduced. If the content of the accelerator is greater than 0.7 parts by weight, curing speed is accelerated, whereby a scorch phenomenon may occur, the ratio of a disulfide bond and a multi-sulfur crosslinking bond may be increased, whereby conventional vulcanization may be induced, and the number of S—S bonds having insufficient thermal stability in a crosslinked chain structure is increased due to an increase in crosslinking length, whereby heat resistance of the molded article may be reduced.

The anti-aging agent is added to increase resistance of rubber to heat and ozone, and may include a heat anti-aging agent and an ozone anti-aging agent.

The anti-aging agent is included so as to account for 0.6 to 1.4 parts by weight based on 100 parts by weight of the base resin.

The heat anti-aging agent is preferably included so as to account for 1 to 2 parts by weight based on 100 parts by weight of the base resin. If the content of the heat anti-aging agent is less than 1 parts by weight, long-term heat resistance of the molded article may be reduced due to deficient heat-aging resistance. If the content of the heat anti-aging agent is greater than 2 parts by weight, blooming may occur, whereby the force of attachment of the molded article may be reduced.

The ozone anti-aging agent is preferably included so as to account for 1.5 to 2.5 parts by weight based on 100 parts by weight of the base resin. If the content of the ozone anti-aging agent is less than 1.5 parts by weight, ozone resistance of the molded article may be reduced, whereby the molded article may be cracked due to oxidation thereof. If the content of the ozone anti-aging agent is greater than 2.5 parts by weight, the mechanical strength of the molded article may be reduced, and the force of attachment of the molded article may be reduced due to blooming.

Molded Article

A molded article according to embodiments of the present invention is manufactured using a natural rubber composition including a base resin including natural rubber, a filler, and an additive.

In embodiments of the present invention, molding is not particularly restricted to injection molding and extrusion molding, and any molding method may be used.

The molded article according to embodiments of the present invention has a hardness (measured based on ISO 7619-1, 18898) of 55 to 65 Hs, a tensile strength (ISO 37 TYPE 1A, Speed: 500 mm/min) of 250 kgf/cm$^2$ or more, and an elongation (ISO 37 TYPE 1A, Speed: 500 mm/min) of 480% or more. When heated at 85° C. for 1000 hours, the molded article has a hardness variation of less than 2%, a tensile strength variation of less than 6%, and an elongation variation of less than 3%. In addition, the molded article has a material dynamic ratio value within a very low range.

Hereinafter, embodiments of the present invention will be described in more detail with reference to examples. However, the following examples are merely an illustration to assist in understanding embodiments of the present invention, and the present invention is not limited by the following examples.

Examples 1 to 3 and Comparative Examples 1 to 12

Molded articles were manufactured using rubber compositions including contents shown in Tables 1 and 2 below.

TABLE 1

|   |    | Ex. 1 | Ex. 2 | Ex. 3 | Comp. Ex. 1 | Comp. Ex. 2 | Comp. Ex. 3 | Comp. Ex. 4 |
|---|----|-------|-------|-------|-------------|-------------|-------------|-------------|
| A | A1 | 100   | 100   | 100   | 100         | 100         | 100         | 100         |
|   | A2 | —     | —     | —     | —           | —           | —           | —           |
| B | B1 | 30    | 25    | 35    | 30          | 30          | 40          | 30          |
|   | B2 | 10    | 15    | 7.5   | 10          | 10          | —           | 10          |
|   | C  | 2     | 3     | 1.5   | —           | 5           | —           | 2           |
| D | D1 | 12    | 12    | 12    | 12          | 12          | 12          | 9           |
|   | D2 | 2     | 2     | 2     | 2           | 2           | 2           | 2           |
| E |    | 0.5   | 0.5   | 0.5   | 0.5         | 0.5         | 0.5         | 0.5         |
| F |    | 0.5   | 0.5   | 0.5   | 0.5         | 0.5         | 0.5         | 0.5         |
| G | G1 | 1.5   | 1.5   | 1.5   | 1.5         | 1.5         | 1.5         | 1.5         |
|   | G2 | 2.0   | 2.0   | 2.0   | 2.0         | 2.0         | 2.0         | 2.0         |

A: Base resin
A1: Natural rubber (NR) (SMR CV60)
A2: Butadiene rubber (BR)
B: Filler
B1: Carbon black (FEF(N550))
B2: Silica (ULTRASIL VN2 (Surface area: 130 m$^2$/g or more))
C: Coupling agent (3-thiocyanato-propyltriethoxysilane, Si264)
D: Activator
D1: Zinc oxide
D2: Stearic acid
E: Crosslinking agent (Sulfur)
F: Accelerator (Tetramethylthiuram disulfide)
G: Anti-aging agent
G1: Heat anti-aging agent (N-isopropyl-N'-phenyl-p-phenylenediamine)
G2: Ozone anti-aging agent (Antilux500)

TABLE 2

|   |   | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|
| A | A1 | 100 | 100 | 100 | 100 | 100 | 100 | 100 | 70 |
|   | A2 | — | — | — | — | — | — | — | 30 |
| B | B1 | 30 | 30 | 30 | 30 | 30 | 30 | 30 | 40 |
|   | B2 | 10 | 10 | 10 | 10 | 10 | 10 | 10 | — |
| C |    | 2 | 2 | 2 | 2 | 2 | 2 | 2 | — |
| D | D1 | 12 | 12 | 12 | 12 | 12 | 12 | 12 | 10 |
|   | D2 | 1.3 | 2 | 2 | 2 | 2 | 2 | 2 | 1.5 |
| E |    | 0.5 | 0.2 | 0.9 | 0.5 | 0.5 | 0.5 | 0.5 | 1.0 |
| F |    | 0.5 | 0.5 | 0.5 | 0.2 | 0.8 | 0.5 | 0.5 | 1.0 |
| G | G1 | 1.5 | 1.5 | 1.5 | 1.5 | 1.5 | 0.8 | 1.5 | 1.5 |
|   | G2 | 2.0 | 2.0 | 2.0 | 2.0 | 2.0 | 2.0 | 1.3 | 1.0 |

A: Base resin
A1: Natural rubber (NR) (SMR CV60)
A2: Butadiene rubber (BR)
B: Filler
B1: Carbon black (FEF(N550))
B2: Silica (ULTRASIL VN2 (Surface area: 130 $m^2/g$ or more))
C: Coupling agent (3-thiocyanato-propyltriethoxysilane, Si264)
D: Activator
D1: Zinc oxide
D2: Stearic acid
E: Crosslinking agent (Sulfur)
F: Accelerator (Tetramethylthiuram disulfide)
G: Anti-aging agent
G1: Heat anti-aging agent (N-isopropyl-N'-phenyl-p-phenylenediamine)
G2: Ozone anti-aging agent (Antilux500)

Experimental Example

The physical properties and heat resistance of the molded article manufactured according to Examples 1 to 3 and Comparative Examples 1 to 12 were measured. The results are shown in Tables 3 and 4 below.

TABLE 3

|   |   | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Hardness (Hs) | | 60 | 58 | 56 | 50 | 58 | 62 | 60 |
| Tensile strength (kgf/$cm^2$) | | 290 | 280 | 270 | 240 | 170 | 310 | 259 |
| Elongation (%) | | 540 | 560 | 590 | 400 | 350 | 520 | 490 |
| Heat resistance (85° C. × 1,000 hr) | Hardness variation (Hs) | +1 | +1 | +1 | +3 | +1 | +1 | +8 |
| | Tensile strength variation (%) | −15 | −15 | −13 | −12 | −15 | −14 | −28 |
| | Elongation variation (%) | −15 | −14 | −12 | −28 | −18 | −16 | −30 |
| Heat resistance (110° C. × 70 hr) | Hardness variation (ΔHs) | +5 | +4 | +3 | +7 | +5 | +5 | +20 |
| | Tensile strength variation (%) | −15 | −15 | −13 | −12 | −15 | −14 | −28 |
| | Elongation variation (%) | −15 | −14 | −12 | −28 | −18 | −16 | −30 |
| Material dynamic ratio (@25 Hz) | | 1.8 | 1.6 | 1.5 | 3.0 | 1.9 | 2.7 | 1.9 |
| Fatigue durability | | 7.5 | 8.0 | 8.4 | 6.1 | 3.5 | 7.4 | 7.9 |

<Evaluation method>
Hardness: ISO 7619-1, 18898
Tensile strength and Elongation: ISO 37 TYPE 1A, Speed: 500 mm/min
Heat resistance: ISO 9272, 23529, 11346
Material dynamic ratio: Based on VDA 675-480, Material Dynamic Performance (Storage Shear Modulus, G') Evaluation (Dynamic Ratio Calculation: G'@25 Hz/G'@static)
Fatigue durability: An hourglass-shaped drum type three-dimensional sample was manufactured and repeatedly translated at 3.3 Hz within a displacement range of −10 to 10 mm in order to measure fatigue durability thereof.

TABLE 4

|  |  | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|
| Hardness (Hs) | | 58 | 50 | 57 | 55 | 59 | 60 | 60 | 59 |
| Tensile strength (kgf/cm²) | | 262 | 180 | 270 | 155 | 275 | 285 | 290 | 185 |
| Elongation (%) | | 500 | 430 | 560 | 450 | 560 | 540 | 520 | 525 |
| Heat resistance (85° C. × 1,000 hr) | Hardness variation (Hs) | +5 | +9 | +8 | +5 | +9 | +4 | +4 | +6 |
| | Tensile strength variation (%) | −25 | −22 | −25 | −16 | −27 | −23 | −15 | −16 |
| | Elongation variation (%) | −25 | −20 | −33 | −18 | −27 | −20 | −14 | −9 |
| Heat resistance (110° C. × 70 hr) | Hardness variation (ΔHs) | +19 | +20 | +20 | +5 | +20 | +12 | +20 | +14 |
| | Tensile strength variation (%) | −50 | −44 | −55 | −22 | −45 | −45 | −56 | −37 |
| | Elongation variation (%) | −55 | −40 | −50 | −25 | −50 | −43 | −59 | −38 |
| Material dynamic ratio (@25 Hz) | | 1.8 | 2.7 | 2.1 | 2.2 | 2.3 | 2.1 | 2.5 | 1.9 |
| Fatigue durability | | 7.8 | 3.4 | 7.4 | 5.0 | 8.0 | 7.4 | 7.1 | 2.9 |

<Evaluation method>
Hardness: ISO 7619-1, 18898
Tensile strength and Elongation: ISO 37 TYPE 1A, Speed: 500 mm/min
Heat resistance: ISO 9272, 23529, 11346
Material dynamic ratio: Based on VDA 675-480, Material Dynamic Performance (Storage Shear Modulus, G') Evaluation (Dynamic Ratio Calculation: G'@25 Hz/G'@static)
Fatigue durability: An hourglass-shaped drum type three-dimensional sample was manufactured and repeatedly translated at 3.3 Hz within a displacement range of −10 to 10 mm in order to measure fatigue durability thereof.

It can be seen from the results shown in Tables 3 and 4 above that in Comparative Example 1, the hardness, tensile strength, and elongation of the molded article were not good, and particularly the elongation variation of the molded article at high temperature was very poor. In addition, it can be seen that the material dynamic ratio value of the molded article was too high and the fatigue durability of the molded article was not excellent.

In Comparative Examples 2 to 11, the hardness, tensile strength, elongation, material dynamic ratio, and fatigue durability of each of the molded articles were not satisfactory.

In contrast, in Examples 1 to 3, in each of which only natural rubber was used and the physical properties of the molded article were improved using the filler and the additive, overall satisfactory results were obtained.

In particular, a decrease in performance when exposed to high temperature for a long time was very small, and material dynamic ratio values were much lower than in Comparative Examples. In addition, excellent results were obtained in terms of fatigue durability.

It can be seen that Examples 1 to 3 exhibited better durability at high temperature than in Comparative Example 12, in which synthetic rubber was mixed, and also exhibited high material dynamic ratios and fatigue durabilities.

As is apparent from the foregoing, according to embodiments of the present invention, it is possible to provide a molded article having excellent long-term heat resistance at high temperature using natural rubber alone.

According to embodiments of the present invention, it is possible to provide a rubber molded article having high fatigue durability.

According to embodiments of the present invention, it is possible to provide a rubber molded article having a low material dynamic ratio value.

The effects of embodiments of the present invention are not limited to those mentioned above. It should be understood that the effects of embodiments of the present invention include all effects that can be inferred from the foregoing description of embodiments of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:
1. A natural rubber composition comprising:
a base resin comprising natural rubber;
a filler comprising carbon black and silica; and
an additive;
wherein the additive comprises a coupling agent, an activator, a crosslinking agent, an accelerator, and an anti-aging agent;
wherein the filler is included at 35 to 70 parts by weight based on 100 parts by weight of the base resin;
wherein the coupling agent comprises silane;
wherein the coupling agent is included at 1 to 4 parts by weight based on 100 parts by weight of the base resin;
wherein the crosslinking agent is included at 0.3 to 0.5 parts by weight based on 100 parts by weight of the base resin;
wherein the accelerator comprises a thiuram-based accelerator;

wherein the accelerator is included at 0.3 to 0.7 parts by weight based on 100 parts by weight of the base resin;
wherein the activator comprises zinc oxide and stearic acid;
wherein the activator is included at 10 to 20 parts by weight based on 100 parts by weight of the base resin;
wherein the anti-aging agent comprises a heat anti-aging agent and an ozone anti-aging agent; and
wherein the anti-aging agent is included at 2.5 to 4.5 parts by weight based on 100 parts by weight of the base resin.

2. The natural rubber composition according to claim 1, wherein:
the carbon black has a diameter of 20 nm to 50 nm; and
the silica has a surface area of 100 to 150 $m^2/g$, measured according to DIN ISO 9277.

3. The natural rubber composition according to claim 1, wherein the carbon black is included at 20 to 50 parts by weight based on 100 parts by weight of the base resin.

4. The natural rubber composition according to claim 1, wherein the silica is included at 5 to 20 parts by weight based on 100 parts by weight of the base resin.

5. The natural rubber composition according to claim 1, wherein the additive is included at 0.1 to 15 parts by weight based on 100 parts by weight of the base resin.

6. The natural rubber composition according to claim 1, wherein:
the zinc oxide is included at 10 to 14 parts by weight based on 100 parts by weight of the base resin; and
the stearic acid is included at 1.5 to 3 parts by weight based on 100 parts by weight of the base resin.

7. The natural rubber composition according to claim 1, wherein the carbon black has a diameter of 20 nm to 50 nm.

8. The natural rubber composition according to claim 1, wherein the silica has a surface area of 100 to 150 $m^2/g$, measured according to DIN ISO 9277.

9. A molded article manufactured using the natural rubber composition according to claim 1.

10. A method of manufacturing a natural rubber composition, the method comprising:
adding a filler comprising carbon black and silica to a base resin comprising natural rubber; and
adding an additive to the base resin before or after adding the filler;
wherein the additive comprises a coupling agent, an activator, a crosslinking agent, an accelerator, and an anti-aging agent,
wherein the filler is included at 35 to 70 parts by weight based on 100 parts by weight of the base resin;
wherein the coupling agent comprises silane;
wherein the coupling agent is included at 1 to 4 parts by weight based on 100 parts by weight of the base resin;
wherein the crosslinking agent is included at 0.3 to 0.5 parts by weight based on 100 parts by weight of the base resin;
wherein the accelerator comprises a thiuram-based accelerator;
wherein the accelerator is included at 0.3 to 0.7 parts by weight based on 100 parts by weight of the base resin;
wherein the activator comprises zinc oxide and stearic acid;
wherein the activator is included at 10 to 20 parts by weight based on 100 parts by weight of the base resin;
wherein the anti-aging agent comprises a heat anti-aging agent and an ozone anti-aging agent; and
wherein the anti-aging agent is included at 2.5 to 4.5 parts by weight based on 100 parts by weight of the base resin.

11. The method according to claim 10, wherein:
the carbon black has a diameter of 20 nm to 50 nm; and
the silica has a surface area of 100 to 150 $m^2/g$, measured according to DIN ISO 9277.

12. The method according to claim 10, wherein the filler is included at 35 to 70 parts by weight based on 100 parts by weight of the base resin.

13. The method according to claim 10, wherein:
the carbon black is included at 20 to 50 parts by weight based on 100 parts by weight of the base resin; and
the silica is included at 5 to 20 parts by weight based on 100 parts by weight of the base resin.

14. The method according to claim 10, wherein the additive is included at 0.1 to 15 parts by weight based on 100 parts by weight of the base resin.

15. A natural rubber composition comprising:
a base resin comprising natural rubber;
a filler included at 35 to 70 parts by weight based on 100 parts by weight of the base resin, the filler comprising carbon black included at 20 to 50 parts by weight based on 100 parts by weight of the base resin and silica included at 5 to 20 parts by weight based on 100 parts by weight of the base resin;
a coupling agent comprising silane included at 1 to 4 parts by weight based on 100 parts by weight of the base resin;
an activator comprising zinc oxide and stearic acid, the activator being included at 10 to 20 parts by weight based on 100 parts by weight of the base resin;
a crosslinking agent included at 0.3 to 0.5 parts by weight based on 100 parts by weight of the base resin;
a thiuram-based accelerator included at 0.3 to 0.7 parts by weight based on 100 parts by weight of the base resin; and
an anti-aging agent comprising a heat anti-aging agent and an ozone anti-aging agent, the anti-aging agent being included at 2.5 to 4.5 parts by weight based on 100 parts by weight of the base resin.

16. The natural rubber composition according to claim 15, wherein the carbon black has a diameter of 20 nm to 50 nm.

17. The natural rubber composition according to claim 15, wherein the silica has a surface area of 100 to 150 $m^2/g$, measured according to DIN ISO 9277.

18. The natural rubber composition according to claim 15, wherein:
the carbon black has a diameter of 20 nm to 50 nm; and
the silica has a surface area of 100 to 150 $m^2/g$, measured according to DIN ISO 9277.

19. The natural rubber composition according to claim 15, wherein the coupling agent, the activator, the crosslinking agent, the accelerator, and the anti-aging agent form an additive that is included at 0.1 to 15 parts by weight based on 100 parts by weight of the base resin.

* * * * *